US012789707B2

(12) United States Patent
Kamata

(10) Patent No.: US 12,789,707 B2
(45) Date of Patent: Nov. 10, 2026

(54) ELECTRONIC MIRROR APPARATUS

(71) Applicant: JVCKENWOOD Corporation, Yokohama (JP)

(72) Inventor: Kotaro Kamata, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 19/019,568

(22) Filed: Jan. 14, 2025

(65) Prior Publication Data

US 2025/0153644 A1 May 15, 2025

Related U.S. Application Data

(63) Continuation of application No. PCT/JP2023/034759, filed on Sep. 25, 2023.

(30) Foreign Application Priority Data

Oct. 27, 2022 (JP) ................................ 2022-172181

(51) Int. Cl.
*B60R 1/29* (2022.01)
*B60R 1/26* (2022.01)
(Continued)

(52) U.S. Cl.
CPC .................. *B60R 1/29* (2022.01); *B60R 1/26* (2022.01); *G06T 11/00* (2013.01); *G06V 20/59* (2022.01);
(Continued)

(58) Field of Classification Search
CPC ....... B60R 1/29; B60R 1/26; B60R 2300/305; B60R 2300/8006; B60R 2001/1253; B60R 1/00; B60R 11/02; B60R 1/12; B60R 11/04; G06T 11/00; G06T 7/00; G06V 20/59; G06V 40/174; H04N 7/18
See application file for complete search history.

(56) References Cited

U.S. PATENT DOCUMENTS

2017/0347067 A1* 11/2017 Bostrom ................ B60K 35/81
2018/0065558 A1* 3/2018 Matsuyama .............. B60R 1/04

FOREIGN PATENT DOCUMENTS

JP 2004306779 A * 11/2004
JP 2014-223887 A 12/2014
(Continued)

OTHER PUBLICATIONS

International Search Report for the corresponding PCT Application No. PCT/JP2023/034759 mailed Nov. 28, 2023, 4 pages.
(Continued)

*Primary Examiner* — Michael E Teitelbaum
(74) *Attorney, Agent, or Firm* — Shih IP Law Group, PLLC

(57) ABSTRACT

A rear imaging unit captures an image of a scene behind a vehicle. An in-vehicle imaging unit captures an image of a rear seat in the vehicle. An electronic mirror display unit displays a rear image of the vehicle captured by the rear imaging unit. An image recognition unit recognizes a facial expression of a person or an animal in the rear seat in the image captured by the in-vehicle imaging unit. A display control unit superimposes the mage representing the facial expression on the rear image and displays a resultant image on the electronic mirror display unit.

6 Claims, 8 Drawing Sheets

(51) Int. Cl.

| | |
|---|---|
| ***G06T 11/00*** | (2026.01) |
| ***G06V 20/59*** | (2022.01) |
| ***G06V 40/16*** | (2022.01) |

(52) U.S. Cl.
CPC ...... *G06V 40/174* (2022.01); *B60R 2300/305* (2013.01); *B60R 2300/8006* (2013.01)

(56) References Cited

FOREIGN PATENT DOCUMENTS

| | | |
|---|---|---|
| JP | 2015-067254 A | 4/2015 |
| JP | 2019-523726 A | 8/2019 |

OTHER PUBLICATIONS

International Preliminary Examination Report on Patentability (II) with Written Opinion of ISA from the corresponding PCT Application No. PCT/JP2023/034759 mailed Jun. 28, 2024, 12 pages.

* cited by examiner

1

ELECTRONIC MIRROR APPARATUS

This application is a Continuation of International Application No. PCT/JP2023/034759, filed on Sep. 25, 2023, which in turn claims the benefit of Japanese Application No. 2022-172181, filed on Oct. 27, 2022, the disclosures of which application is incorporated by reference herein.

BACKGROUND

1. Technical Field

The present disclosure relates to an electronic mirror apparatus used as a rearview mirror.

2. Description of the Related Art

In recent years, there has been a growing movement to replace conventional optical rearview mirrors (also called room mirrors) with electronic digital rearview mirrors. In general, a rear camera that captures an image of a scene behind the vehicle is installed on the rear window. When a digital rearview mirror is used, therefore, the view of the scene behind the vehicle is not obstructed by luggage, etc. in the vehicle. On the other hand, the image displayed on the digital rearview mirror does not show the rear seat, making it difficult to check the condition of the rear seat. With conventional optical rearview mirrors, the driver can see the scene of the rear seat by changing the viewpoint slightly.

In this background, an electronic mirror apparatus capable of switching between a digital rearview mirror and an optical rearview mirror has been developed. Patent Literature 1 also proposes a method of displaying the facial expression of a person sitting in the rear seat as an icon on the display unit of the front seat.

[Patent Literature 1] JP2015-67254

When the driver looks behind to check the scene of the rear seat, he or she will be doing distracted driving. In an electronic mirror apparatus capable of switching between a digital rearview mirror and an optical rearview mirror, a button operation, etc. is required for switching. In addition, the viewing angle and the distance felt differ between a digital rearview mirror and an optical rearview mirror, and it takes time for the eyes to focus on the optical rearview mirror after the apparatus switches to the optical rearview mirror. The display of the car navigation apparatus is assumed to be used as the display unit of the front seat described above. When the driver looks at the display of the car navigation apparatus, the attention to a scene ahead is lowered.

SUMMARY

An electronic mirror apparatus according to an embodiment includes: a first imaging unit that captures an image of a scene behind a vehicle; a second imaging unit that captures an image of a rear seat in the vehicle; an electronic mirror display unit that displays a rear image of the vehicle captured by the first imaging unit; an image recognition unit that recognizes a facial expression of a person or an animal in the rear seat in the image captured by the second imaging unit; and a display control unit that superimposes an image representing the facial expression on the rear image and displays a resultant image on the electronic mirror display unit.

Optional combinations of the aforementioned constituting elements, and implementations of the embodiments in the form of methods, apparatuses, systems, recording mediums, and computer programs may also be practiced as modes of the embodiments.

DETAILED DESCRIPTION

The invention will now be described by reference to the preferred embodiments. This does not intend to limit the scope of the present invention, but to exemplify the invention.

Figure 1:
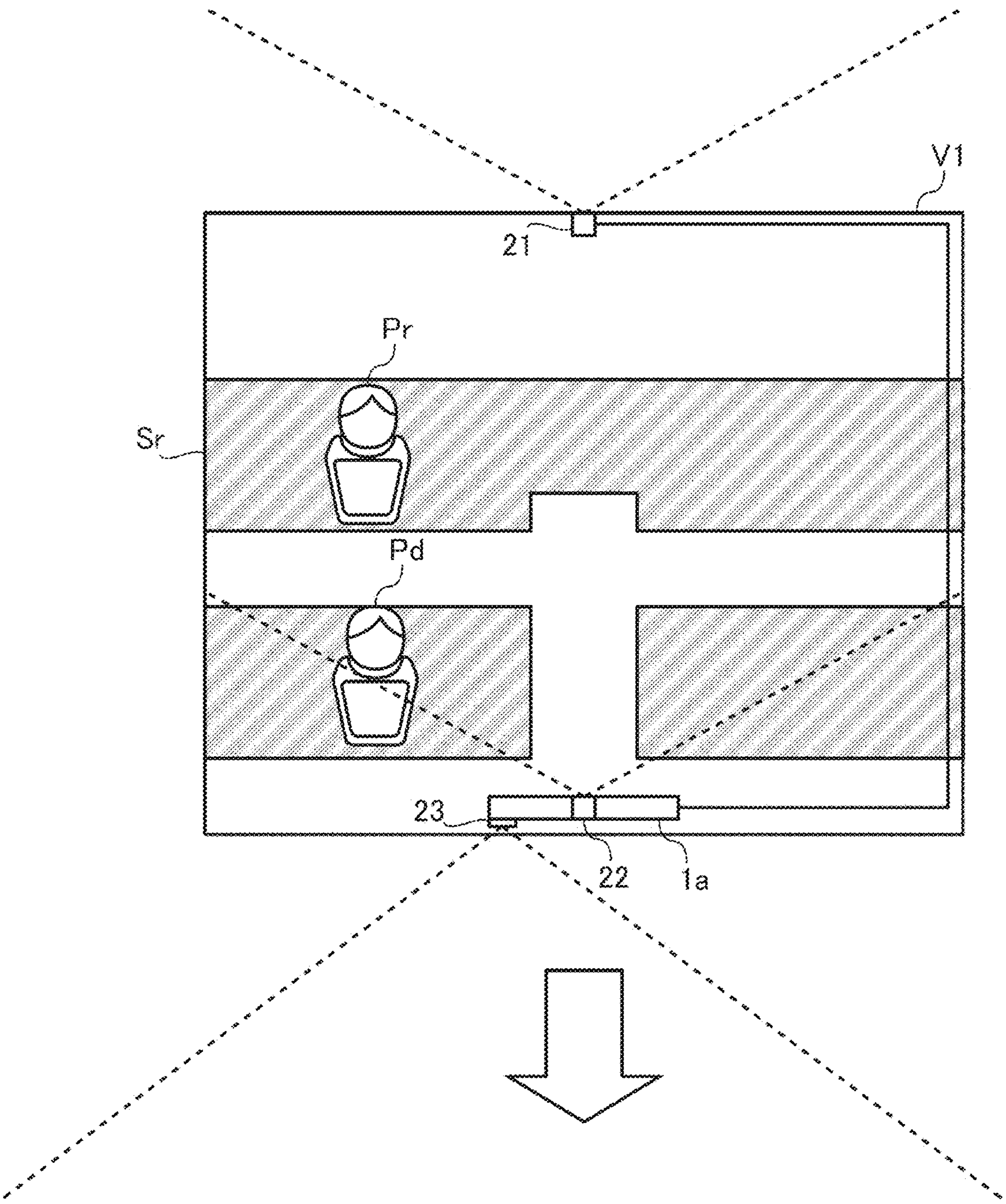
FIG. 1 shows an exemplary installation of the electronic mirror apparatus according to the embodiment.

FIG. 1 shows an exemplary installation of the electronic mirror apparatus 1 according to the embodiment. The electronic mirror apparatus 1 according to the embodiment includes a main body 1*a* and a rear imaging unit 21. In the example shown in FIG. 1, the main body 1*a* of the electronic mirror apparatus 1 is layered on the mirror surface of the existing optical rearview mirror and is fixed to the existing rearview mirror with a plurality of bands. The rear imaging unit 21 is, for example, fixed by a double-sided tape on the interior side of the rear window of a vehicle V1. The rear imaging unit 21 may be installed at any position as long as it can capture an image of a scene behind the vehicle V1. The rear imaging unit 21 may be encased in a waterproof case and installed outside the vehicle V1.

Hereinafter, an electronic mirror apparatus 1 (also referred to as a mirror recorder) integrated with a drive recorder will be described in this embodiment. In the mirror recorder, a front imaging unit 23 is installed on the back surface of the main body 1*a* (the surface facing the direction of travel of the vehicle V1). In further accordance with this embodiment, an in-vehicle imaging unit 22 that captures an image of a rear seat Sr in the vehicle V1 is installed in the upper part of the main body 1*a*. The in-vehicle imaging unit 22 may be installed at any position as long as it can capture an image of the rear seat Sr. For example, the in-vehicle imaging unit 22 may be installed at a predetermined position on the ceiling of the vehicle cabin. Further, in the case of the vehicle V1 equipped with an in-vehicle monitoring system, the camera of the in-vehicle monitoring system may be used as the in-vehicle imaging unit 22 according to this embodiment.

Figure 2:
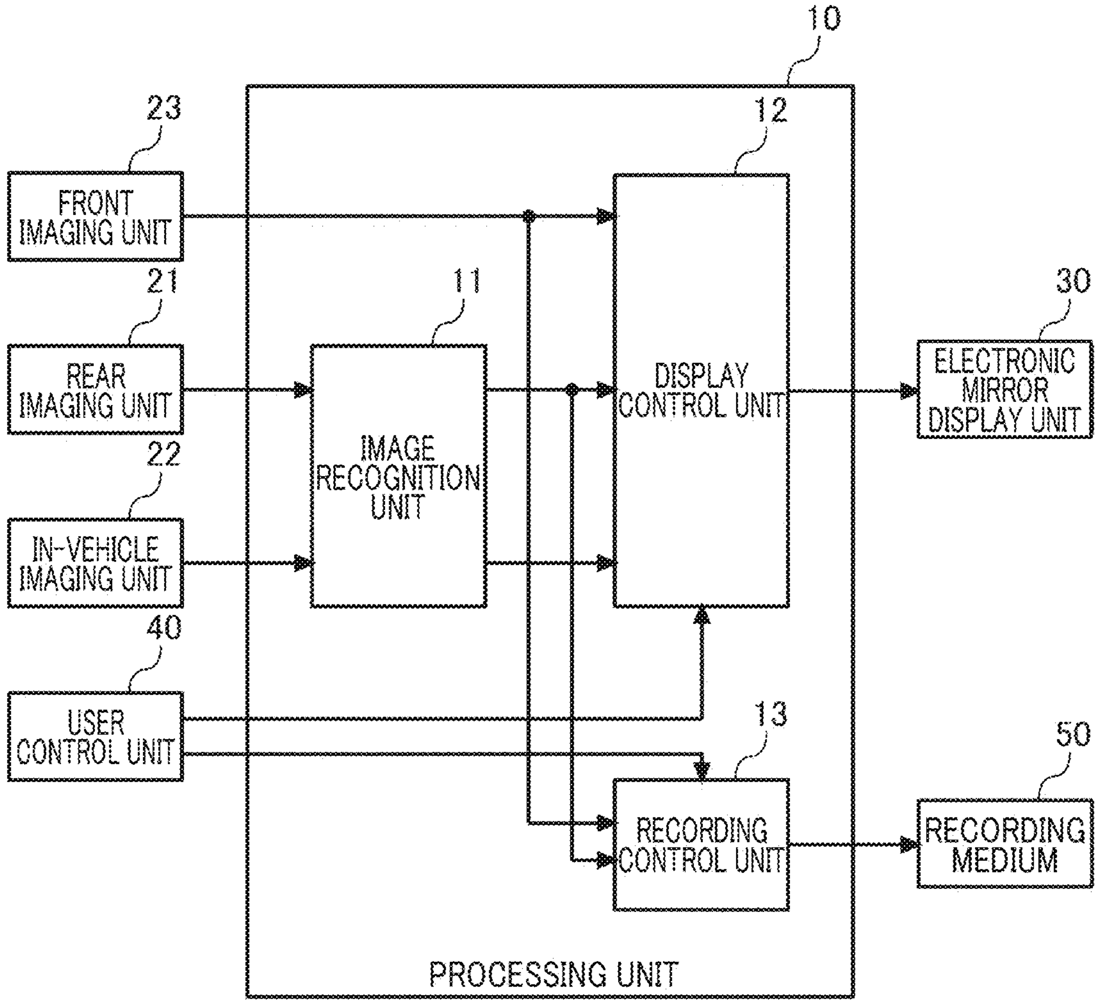
FIG. 2 shows a system configuration of the electronic mirror apparatus according to the embodiment.

FIG. 2 shows a system configuration of the electronic mirror apparatus 1 according to the embodiment. The electronic mirror apparatus 1 includes a processing unit 10, a rear imaging unit 21, an in-vehicle imaging unit 22, a front imaging unit 23, an electronic mirror display unit 30, a user operation unit 40, and a recording medium 50.

The rear imaging unit 21, the in-vehicle imaging unit 22, and the front imaging unit 23 each include a lens and a solid-state imaging device. For example, a CMOS (Complementary Metal Oxide Semiconductor) image sensor or a CCD (Charge Coupled Device) image sensor may be used as the solid-state imaging device. The solid-state imaging device converts the light incident via a lens into an electrical video signal and outputs the signal to the processing unit 10.

The electronic mirror display unit 30 includes a display such as a liquid crystal display, an organic EL display, and a mini LED display and displays the image supplied from the processing unit 10. The user operation unit 40 receives a user operation of the user (a driver Pd in this embodiment) and outputs a user operation signal corresponding to content of user's operation to the processing unit 10. In this embodiment, the electronic mirror display unit 30 and the user operation unit 40 constitute a touch panel display. A physical button may be installed as part of the user operation unit 40 around the electronic mirror display unit 30.

The electronic mirror display unit 30 mainly displays a rear image of the vehicle V1 captured by the rear imaging unit 21. The driver Pd can use the user operation unit 40 to select an image displayed on the electronic mirror display unit 30. Specifically, the user can select either the rear image of the vehicle V1 captured by the rear imaging unit 21, the front image of the vehicle V1 captured by the front imaging unit 23, or both images (split screen).

The driver Pd can use the user operation unit 40 (e.g., by pressing the power button in the lower part of the main body 1*a*) to select using the electronic mirror display unit 30 as a display for displaying the rear image, etc. or a normal optical rearview mirror (mirror mode). For example, it is possible to switch between the display mode and the mirror mode by layering a half-mirror and a glass on the display and controlling the transmittance and reflectance of the half-mirror.

The user operation unit 40 may include a microphone, and the processing unit 10 may include a voice recognition unit so that various user operation signals may be generated by the user's voice command.

The recording medium 50 is a large-capacity non-volatile recording medium. For example, a semiconductor memory card can be used. The recording medium 50 can record the front image of the vehicle V1 captured by the front imaging unit 23 and the rear image of the vehicle V1 captured by the rear imaging unit 21.

The processing unit 10 includes an image recognition unit 11, a display control unit 12, and a recording control unit 13. The processing unit 10 is realized by cooperation between hardware resources and software resources or by hardware resources only. CPU, ROM, RAM, GPU (Graphics Processing Unit), ASIC (Application Specific Integrated Circuit), FPGA (Field Programmable Gate Array) or other LSIs can be used as Hardware resources. As the software resources, programs such as firmware can be employed.

The recording control unit 13 records the forward image of the vehicle V1 captured by the front imaging unit 23 and the rear image of the vehicle V1 captured by the rear imaging unit 21 in the recording medium 50 in a predetermined format.

The image recognition unit 11 recognizes the face of a person (mainly a child Pr or an infant) or an animal (e.g., a pet such as a dog or a cat) in the rear seat Sr in the image captured by the in-vehicle imaging unit 22. The image recognition unit 11 includes a detector for detecting the face of a person or an animal to be detected. For example, a detector is generated for each facial expression of a person or an animal to be detected and is maintained as dictionary data. In this embodiment, it is not necessary to identify an individual person.

Each detector is generated by learning the facial features included in a large number of images showing persons or animals to be detected. The face of a person or an animal in the image is annotated with a facial expression before the feature is learned. For example, HOG (Histograms of Oriented Gradients), Haar-like, LBP (Local Binary Patterns), etc. features can be used.

The image recognition unit 11 searches each frame image of the video input from the in-vehicle imaging unit 22 by using each detector. When the image recognition unit 11 detects a face of a person or an animal in the frame image, the image recognition unit 11 tracks the detected face in subsequent frame images. For face tracking, a particle filter or a mean shift method can, for example, be used.

The display control unit 12 superimposes an image representing the facial expression of a person or an animal in the rear seat Sr recognized by the image recognition unit 11 on the rear image of the vehicle V1. The display control unit 12 may use, for example, an OSD (On-Screen Display) function to superimpose the image representing the facial expression. The display control unit 12 causes the electronic mirror display unit 30 to display the rear image of the vehicle V1 on which the image representing the facial expression is superimposed.

Figure 3:
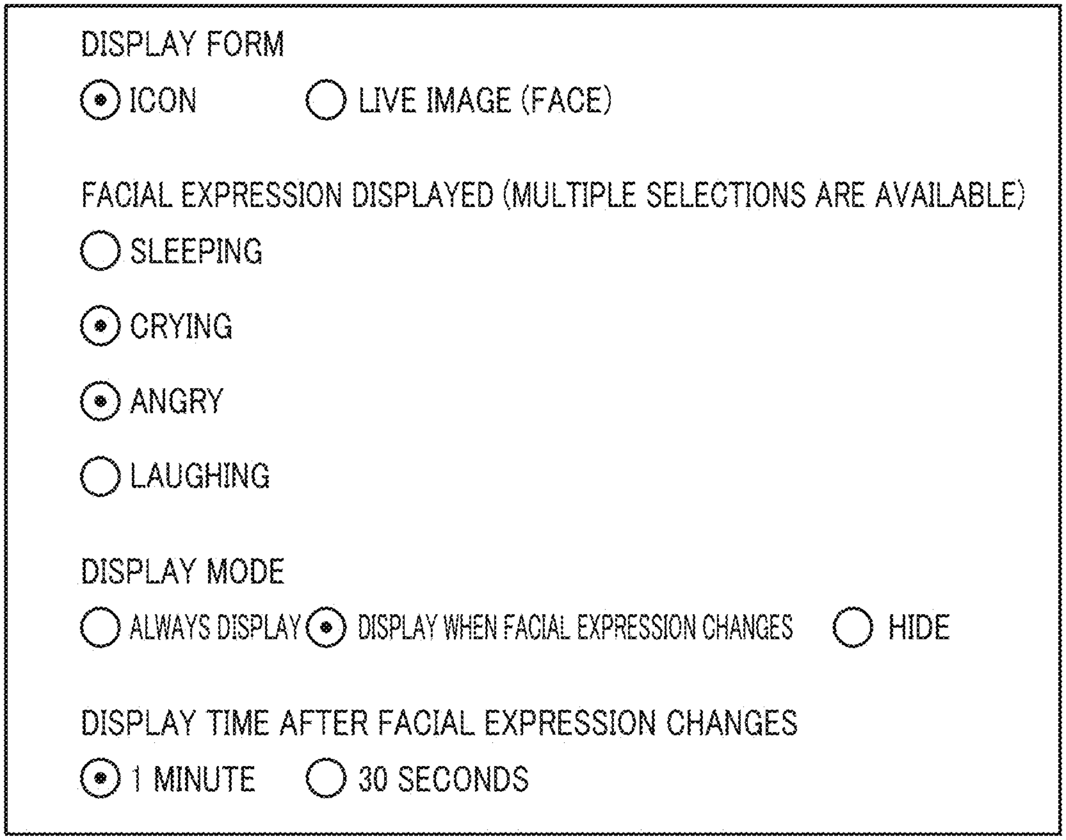
FIG. 3 shows an exemplary setting screen related to the display of the facial expression of a person or an animal in the rear seat.

FIG. 3 shows an exemplary setting screen related to the display of the facial expression of a person or an animal in the rear seat Sr. In the setting example shown in FIG. 3, the user selects either "icon" or "live image" as the display form of a facial expression. The user can specify the type of facial expression to be superimposed on the rear image. In the example shown in FIG. 3, "sleeping", "crying", "angry", and "laughing" are set as facial expressions that can be superimposed, and the user can specify whether to display each facial expression or not.

The user selects one of "always display", "display when the facial expression changes", or "hide" as the display mode of a facial expression. When "display when the facial expression changes" is selected, the item for display time after a facial expression change is enabled. In the example shown in FIG. 3, the user selects either "1 minute" or "30 seconds". The facial expression is no longer displayed when the selected time elapses since the facial expression is displayed in an icon or displayed live. When "always display" or "hide" is selected as the display mode of a facial expression, the item for display time after a facial expression change is disabled.

The display control unit 12 maintains a plurality of icon images corresponding to the types of facial expression. In the setting state in which "icon" is selected, the display control unit 12 selects an icon image corresponding to the facial expression recognized by the image recognition unit 11 and superimposes the selected icon image on the rear image.

In the setting state in which "live image" is selected, the display control unit 12 cuts out an image of an area including the face of a person or an animal from the frame image captured by the in-vehicle imaging unit 22 and superimposes the image of the area including the face thus cut out on the rear image. The area including the face may be an area that includes only the face or may be an area that includes the face and the upper body.

Figure 4:
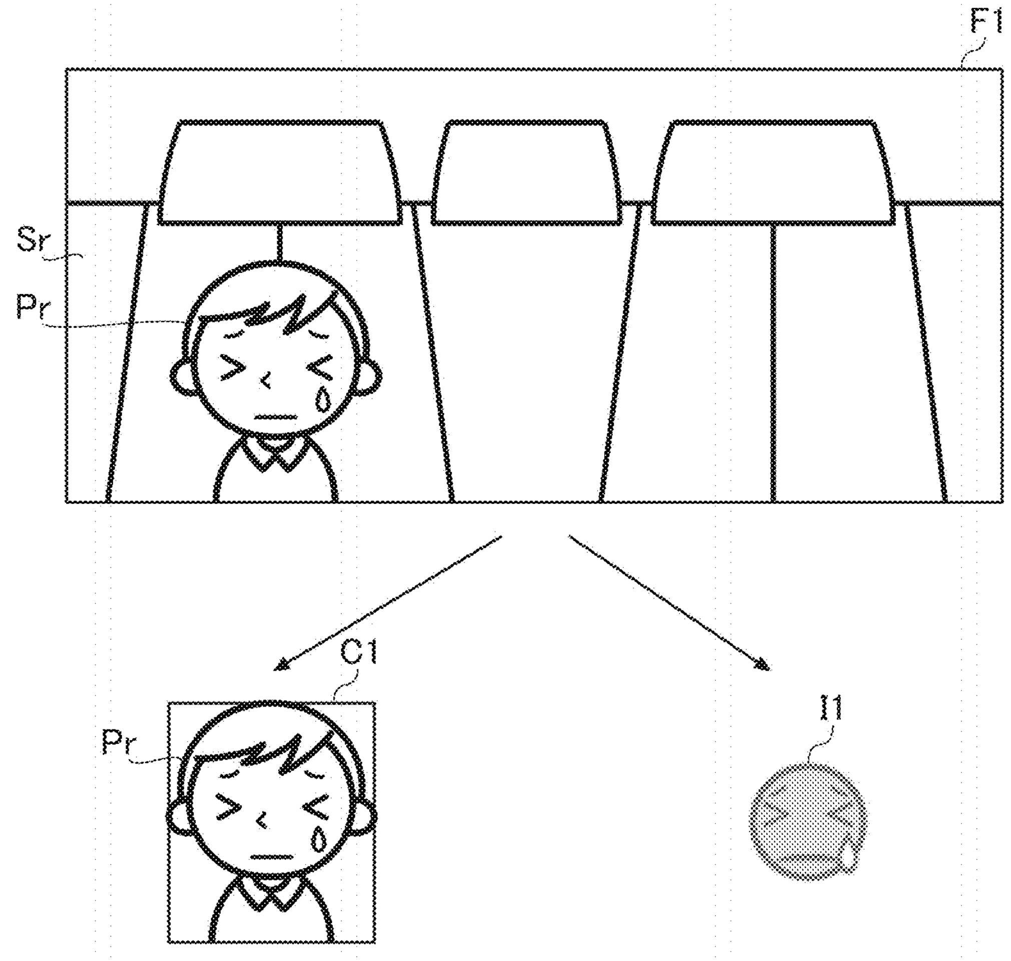
FIG. 4 shows an example where a crying child is sitting in the rear seat.

FIG. 4 shows an example where a crying child Pr is sitting in the rear seat Sr. In the setting state in which "live image" is selected, the display control unit 12 cuts out an area C1 including the face and the upper body of the crying child Pr from the frame image F1. In the setting state in which "icon" is selected, the display control unit 12 reads an icon image I1 of a crying face.

Figure 5:
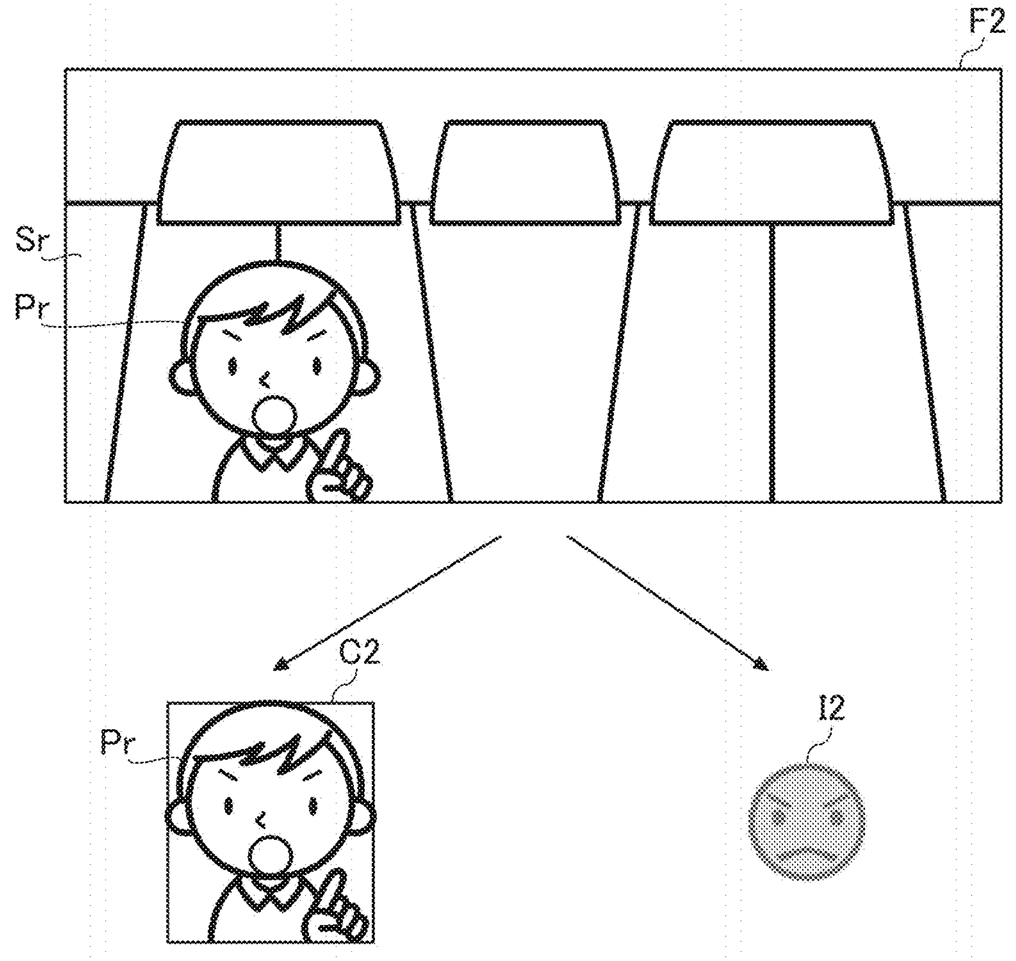
FIG. 5 shows an example where an angry child is sitting in the rear seat.

FIG. 5 shows an example where an angry child Pr is sitting in the rear seat Sr. In the setting state in which "live image" is selected, the display control unit 12 cuts out an area C2 including the face and the upper body of the angry child Pr from the frame image F2. In the setting state in which "icon" is selected, the display control unit 12 reads an icon image 12 of an angry face.

Figure 6:
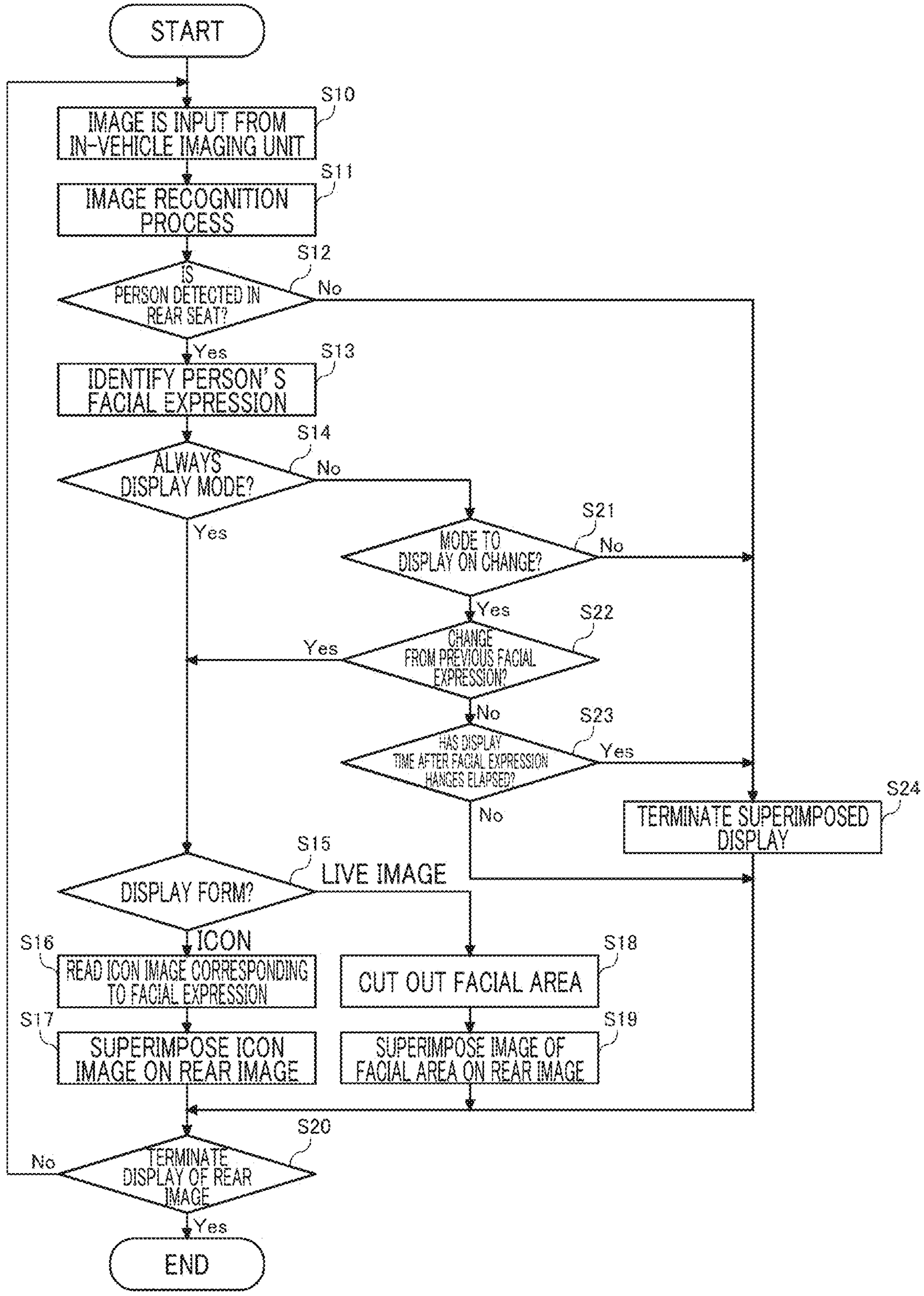
FIG. 6 is a flowchart showing an exemplary operation of the electronic mirror apparatus according to the embodiment.

FIG. 6 is a flowchart showing an exemplary operation of the electronic mirror apparatus 1 according to the embodiment. The image showing the rear seat Sr is input from the in-vehicle imaging unit 22 to the processing unit 10 (step S10). The image recognition unit 11 searches each frame image input from the in-vehicle imaging unit 22 by using each detector (step S11). When a person is detected in the rear seat Sr in the frame image (step S12: Yes), the image recognition unit 11 identifies the person's facial expression (step S13).

When "always display" is selected as the display mode of a facial expression (step S14: Yes) and when "icon" is selected as the display form of a facial expression (step S15: Icon), the display control unit 12 reads the icon image corresponding to the facial expression (step S16). The display control unit 12 superimposes the icon image thus read on the rear image captured by the rear imaging unit 21 and displays the resultant image on the electronic mirror display unit 30 (step S17). While the display of the rear image is not terminated (step S20: No), the process transitions to step S10. When the display of the rear image is terminated (step S20: Yes), the process of superimposing the image representing the facial expression is also terminated.

When "always display" is selected as the display mode of a facial expression (step S14: Yes) and when "live image" is selected as the display form of a facial expression (step S15: live image), the display control unit 12 cuts out an image of the facial area of the detected person (step S18). The display control unit 12 superimposes the image of the facial area thus cut out on the rear image captured by the rear imaging unit 21 and displays the resultant image on the electronic mirror display unit 30 (step S19). While the display of the rear image is not terminated (step S20: No), the process transitions to step S10. When the display of the rear image is terminated (step S20: Yes), the process of superimposing the image representing the facial expression is also terminated.

When "display when the facial expression changes" is selected as the display mode of a facial expression (step S14: No, step S21: Yes) and when the facial expression has changed from the previous frame image (step S22: Yes), the process of step S15-step S20 is executed.

When "display when the facial expression changes" is selected as the display mode of a facial expression (step S14: No, step S21: Yes), when the facial expression has not changed from the previous frame image (step S22: No), and when the display time after a facial expression change has not elapsed (step S23: No), the process transitions to step S20.

When "display when the facial expression changes" is selected as the display mode of a facial expression (step S14: No, step S21: Yes) and when the facial expression has not changed from the previous frame image (step S22: No), and when the display time after a facial expression change has elapsed (step S23: YES), the display control unit 12 terminates the superimposed display of the image representing the facial expression (step S24). The process transitions to step S20.

When "hide" is selected as the display mode of a facial expression (step S14: No, step S21: No), the display control unit 12 does not superimpose and display the image representing the facial expression (step S24). When a person is not detected in the rear seat Sr (step S12: No), too, the display control unit 12 does not superimpose and display the image representing the facial expression (step S24). The process transitions to step S20.

Figure 7A:
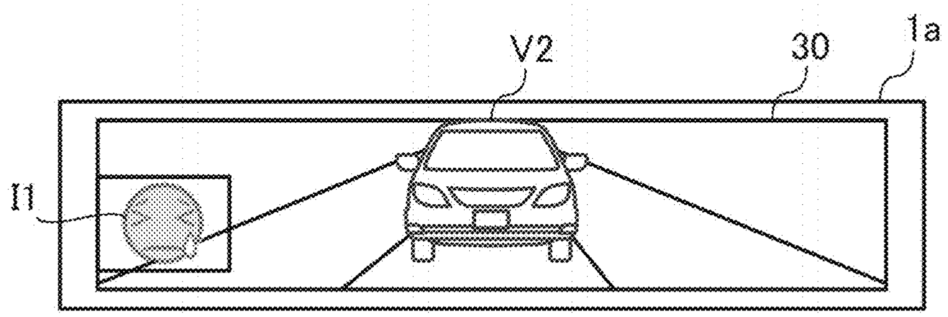
FIGS. 7A-7B show exemplary screens in which the image representing the facial expression is superimposed on the rear image displayed on the electronic mirror display unit.
Figure 7B:
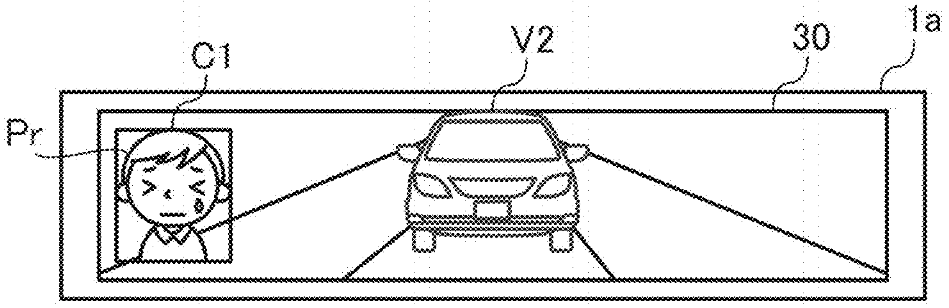

FIGS. 7A-7B show exemplary screens in which the image representing the facial expression is superimposed on the rear image displayed on the electronic mirror display unit 30. The rear image displayed on the electronic mirror display unit 30 shows a rear vehicle V2. FIG. 7A shows an exemplary screen in which an icon image I1 of a crying face is superimposed in the left end area of the rear image. FIG. 7B shows an exemplary screen in which a cropped image of the area C1 including the face and the upper body of a crying child Pr is superimposed in the left end area of the rear image.

The image recognition unit 11 may include a detector for detecting a rear vehicle. In this case, the image recognition unit 11 can detect the rear vehicle in the rear image captured by the rear imaging unit 21. When the rear vehicle is detected by the image recognition unit 11, the display control unit 12 superimposes the image representing the facial expression in an area in the rear image outside the area that shows the rear vehicle. If overlapping with the area in the rear image that shows the rear vehicle cannot be avoided, the display control unit 12 may skip the superposition of the image representing the facial expression. The display control unit 12 may uniformly skip the superposition of the image representing the facial expression when the rear vehicle is detected by the image recognition unit 11.

Figure 8A:
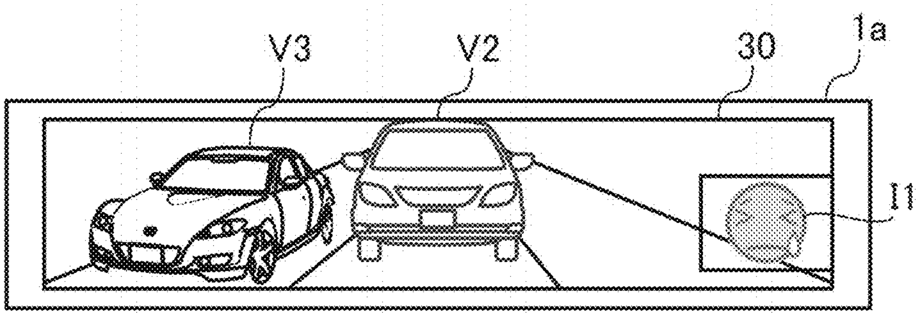
FIGS. 8A-8B show further exemplary screens in which the image representing the facial expression is superimposed on the rear image displayed on the electronic mirror display unit.
Figure 8B:
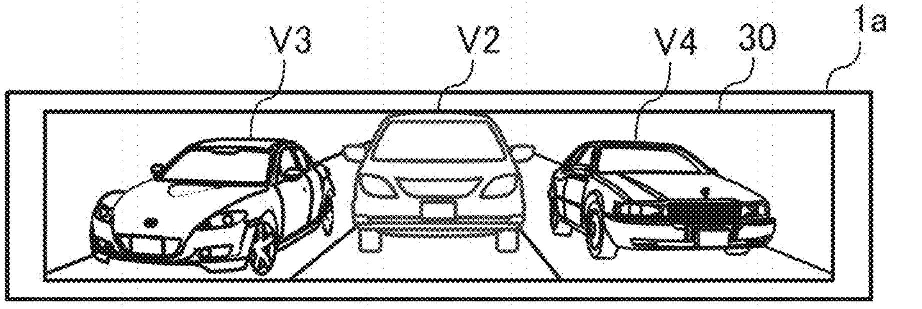

FIGS. 8A-8B show further exemplary screens in which the image representing the facial expression is superimposed on the rear image displayed on the electronic mirror display unit 30. In the example shown in FIG. 8A, a rear vehicle V2 is located in the center lane on a three-lane road, and a rear vehicle V3 is also located in the right lane. In order to avoid overlapping with the rear vehicle V3 in the right lane, the display control unit 12 superimposes the icon image I1 of a crying face in the right end area of the rear image.

In the example shown in FIG. 8B, a rear vehicle V2 is located in the center lane on a three-lane road, a rear vehicle V3 is located in the right lane, and a rear vehicle V4 is located in the left lane. The display control unit 12 cannot secure an area for displaying the icon image I1 and so skips the display of the icon image.

Even if a rear vehicle is detected, an area for displaying the icon image I1 can be secured when the rear vehicle is distanced from the driver's vehicle. When the image recognition unit 11 detects a rear vehicle but the area occupied by the rear vehicle in the screen is small, the display control unit 12 may display the icon image I1, determining that the rear vehicle is sufficiently distanced.

As described above, according to this embodiment, the scene of the rear seat Sr can be monitored safely in the case the electronic mirror apparatus 1 is used. The driver Pd can check the facial expression of a person in the rear seat Sr without looking back and can prevent distracted driving. In addition, there is no need to switch between the display mode and the mirror mode so that it is possible to avoid lowered attention to driving due to a switching operation. In addition, the focal length of the eyes does not change due to mode switching so that the safety is not impaired. It takes time for people, especially elders, to focus their eyes so that the safety is impaired when the mode is switched.

Further, when "display when the facial expression changes" is selected as the display mode of a facial expression, a change in the facial expression is used as a trigger, and so it is easy to determine that the facial expression (condition) of the person sitting in the rear seat Sr has changed. Further, when "icon" is selected as the display form of a facial expression, it is easy to determine a facial expression (condition) of the person even if the rear seat Sr is dark. Further, it is possible to prevent the safety from being impaired by displaying an image representing the facial expression so as not to overlap the rear vehicle.

Given above is a description of the present disclosure based on the embodiment. The embodiment is intended to be illustrative only and it will be understood by those skilled in the art that various modifications to combinations of constituting elements and processes are possible and that such modifications are also within the scope of the present disclosure.

In the above-described embodiment, a mirror recorder in which the functions of an electronic mirror displaying a rear image and a drive recorder are integrated has been described by way of example. A pure electronic mirror apparatus 1 not equipped with the function of a drive recorder may be used. In that case, the front imaging unit 23, the recording medium 50, and the recording control unit 13 are omitted.

With regard to the settings related to the display of a facial expression shown in FIG. 3, an item for setting the size of an image representing a facial expression to be superimposed on the rear image may be included.

What is claimed is:

1. An electronic mirror apparatus comprising:

a first imaging unit that captures an image of a scene behind a vehicle;

a second imaging unit that captures an image of a rear seat in the vehicle;

an electronic mirror display unit that displays a rear image of the vehicle captured by the first imaging unit;

an image recognition unit that detects a rear vehicle in the image captured by the first imaging unit and recognizes a facial expression of a person or an animal in the rear seat in the image captured by the second imaging unit; and a display control unit that superimposes an image representing the facial expression on the rear image and displays a resultant image on the electronic mirror display unit, wherein the display control unit is configured to:

when the rear vehicle is detected in the rear image, first superimposes the image representing the facial expression on an area outside an area showing the rear vehicle, and when overlapping with the area showing the rear vehicle cannot be avoided, skip the superimposition of the image representing the facial expression.

2. The electronic mirror apparatus according to claim 1, wherein the display control unit is further configured to select an icon image corresponding to the facial expression and superimposed the icon image selected on the rear image.

3. The electronic mirror apparatus according to claim 1, wherein the display control unit is further configured to superimpose an image representing a designated type of facial expression on the rear image.

4. The electronic mirror apparatus according to claim 1, wherein the display control unit is further configured to cut out an image of an area including a face of the person or the animal from the image captured by the second imaging unit and superimposes the image of the area cut out to include the face on the rear image.

5. The electronic mirror apparatus according to claim 1, wherein the display control unit is further configured to superimpose the image representing the facial expression on an area in the rear image outside an area showing the rear vehicle, when the rear vehicle is detected by the image recognition unit in the rear image captured by the first imaging unit.

6. The electronic mirror apparatus according to claim 1, wherein the display control unit is further configured to superimpose the image representing the facial expression on the rear image in response to a detected change in the facial expression and terminates the superimposed display after a preset display time elapses.

* * * * *